(12) United States Patent
Engblom et al.

(10) Patent No.: US 8,075,145 B2
(45) Date of Patent: Dec. 13, 2011

(54) DISPLAY SCREEN SHADES FOR MOBILE DEVICES

(76) Inventors: James A. Engblom, Oak Ridge, TN (US); Raymond A. Engblom, Swarthmore, PA (US); Robert J. Lauf, Oak Ridge, TN (US)

( * ) Notice: Subject to any disclaimer, the term of this patent is extended or adjusted under 35 U.S.C. 154(b) by 120 days.

(21) Appl. No.: 12/717,972

(22) Filed: Mar. 5, 2010

(65) Prior Publication Data

US 2011/0216415 A1   Sep. 8, 2011

(51) Int. Cl.
  *G02B 27/00* (2006.01)
(52) U.S. Cl. ................................ 359/609; 361/679.06
(58) Field of Classification Search ..................... None
  See application file for complete search history.

(56) References Cited

U.S. PATENT DOCUMENTS

| | | |
|---|---|---|
| 4,768,865 A | 9/1988 | Greenberg et al. |
| 5,448,405 A * | 9/1995 | Clausen et al. ............... 359/601 |
| 6,130,772 A | 10/2000 | Cava |
| 6,349,221 B1 | 2/2002 | Wolf et al. |
| 6,415,138 B2 | 7/2002 | Sirola et al. |
| 6,445,574 B1 | 9/2002 | Saw et al. |
| 6,466,202 B1 | 10/2002 | Suso et al. |
| 6,927,747 B2 | 8/2005 | Amirzadeh et al. |
| 7,230,585 B2 | 6/2007 | Wakefield |
| 7,553,034 B1 * | 6/2009 | Liou et al. ..................... 359/601 |

* cited by examiner

*Primary Examiner* — Arnel C Lavarias
*Assistant Examiner* — Derek S Chapel
(74) *Attorney, Agent, or Firm* — Olive Law Group, PLLC

(57) ABSTRACT

Display screen shades for mobile devices are provided. According to a representative embodiment, a display screen shade includes a bracket assembly configured for attachment to a mobile device. Further, the display screen shade includes a light valve for covering a display screen of the mobile device. The display screen shade also includes a hinge attached to the bracket assembly and the light valve. The hinge is configured to permit movement of the light valve between a first position and second position when the bracket assembly is attached to the mobile device. In the first position, the light valve substantially covers the display screen in the first position. In the second position, the light valve is positioned further from the display screen than in the first position.

16 Claims, 6 Drawing Sheets

DISPLAY SCREEN SHADES FOR MOBILE DEVICES

TECHNICAL FIELD

The presently disclosed subject matter relates to mobile devices. More particularly, the presently disclosed subject matter relates to apparatus and methods for reducing glare on display screens of mobile devices.

BACKGROUND

Mobile devices, such as mobile phones and smart phones, typically include display screens for displaying selected information and graphics to users. Smart phones, for example, have a small display screen for use when viewing Internet pages, using an on-board digital camera, emailing, etc. Laptop computers, notebook computers, and other personal digital devices (PDAs) also have display screens for displaying data, images, documents, and the like. Portable televisions, electronic games, and other devices also contain small display screens of various types. By their nature, all such mobile devices are intended to be functional when used outdoors; however, it is well known that under some circumstances ambient sunlight can make display screens on mobile devices difficult to view.

It is also well known that mobile devices should satisfy various user requirements regarding size, weight, thickness, battery life, and other performance attributes. It is therefore desirable to provide methods and apparatus of shielding display screens from ambient sunlight without unduly adding to the size, weight, cost, or complexity of mobile devices. Accordingly, it is desirable to provide convenient methods and apparatus of shading screen displays of mobile devices.

SUMMARY

According to a representative embodiment of the presently disclosed subject matter, a display screen shade for a mobile device is provided. The display screen shade includes a bracket assembly configured for attachment to a mobile device. Further, the display screen shade includes a light valve for covering a display screen of the mobile device. The display screen shade also includes a hinge attached to the bracket assembly and the light valve. The hinge is configured to permit movement of the light valve between a first position and second position when the bracket assembly is attached to the mobile device. In the first position, the light valve substantially covers the display screen in the first position. In the second position, the light valve is positioned further from the display screen than in the first position.

In an aspect, the bracket assembly includes at least one bracket having opposing legs that define a space therebetween for gripping a portion of the mobile device. The bracket assembly can include spaced-apart first and second brackets for gripping different portions of the mobile device. The first and second brackets can be positioned at distal ends of the bracket assembly.

In another aspect, the light valve is configured to function in a high optical transmission mode and a low optical transmission mode. The light valve is substantially light-transmissive in the high optical transmission mode when the light valve is positioned to substantially cover the display screen. The light valve is substantially opaque in the low optical transmission mode when the light valve is positioned further from the display screen.

In yet another aspect, a display screen shade can include a power source configured to power and activate the low and high optical transmission modes of the light valve. A power cord can be provided for communicating electrical power between the power source and the light valve.

In another aspect, the display screen shade can include a frame configured to carry the light valve. The frame can provide rigidity and support to the light valve.

According to another representative embodiment of the presently disclosed subject matter, a display screen shade for a mobile device includes a substantially planar light valve capable of being electrically switched between a high optical transmission mode and a low optical transmission mode. The light valve has an active area such that a display screen of the mobile device is viewable therethrough when the light valve is in a first position. A mechanical support configured to allow the light valve to be moved between the first position and a second position. The light valve is positioned to shade a display screen of the mobile device in the second position. The display screen shade also includes a power supply for the light valve. Further, a switch is configured to activate the power supply to change the light valve from the high optical transmission mode in the first position to the low optical transmission mode in the second position. The low optical transmission mode is less transmissive than the high optical transmission mode.

In an aspect, the light valve can be either an electrooptic device, an electrochromic device, or a liquid crystal device.

In another aspect, a mechanical support of the display screen shade is configured for rotational movement of the light valve about at least one axis. The mechanical support can alternatively be configured for rotational movement of the light valve about at least two axes.

In another aspect, in the low optical transmission mode, the second position disposes the light valve above the display screen of the mobile device to shade the display screen from ambient light.

In another aspect, in the low optical transmission mode, the second position disposes the light valve alongside the display device to prevent the display from being viewed from the side.

In another aspect, a power supply of the display screen shade is one of a battery and a photovoltaic device.

In another aspect, the switch of the display screen shade is automatically engaged when the light valve is moved from the first to the second positions.

In another aspect, the switch of the display screen shade is configured to be operated by a user independently of the physical movement of the light valve.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1A:
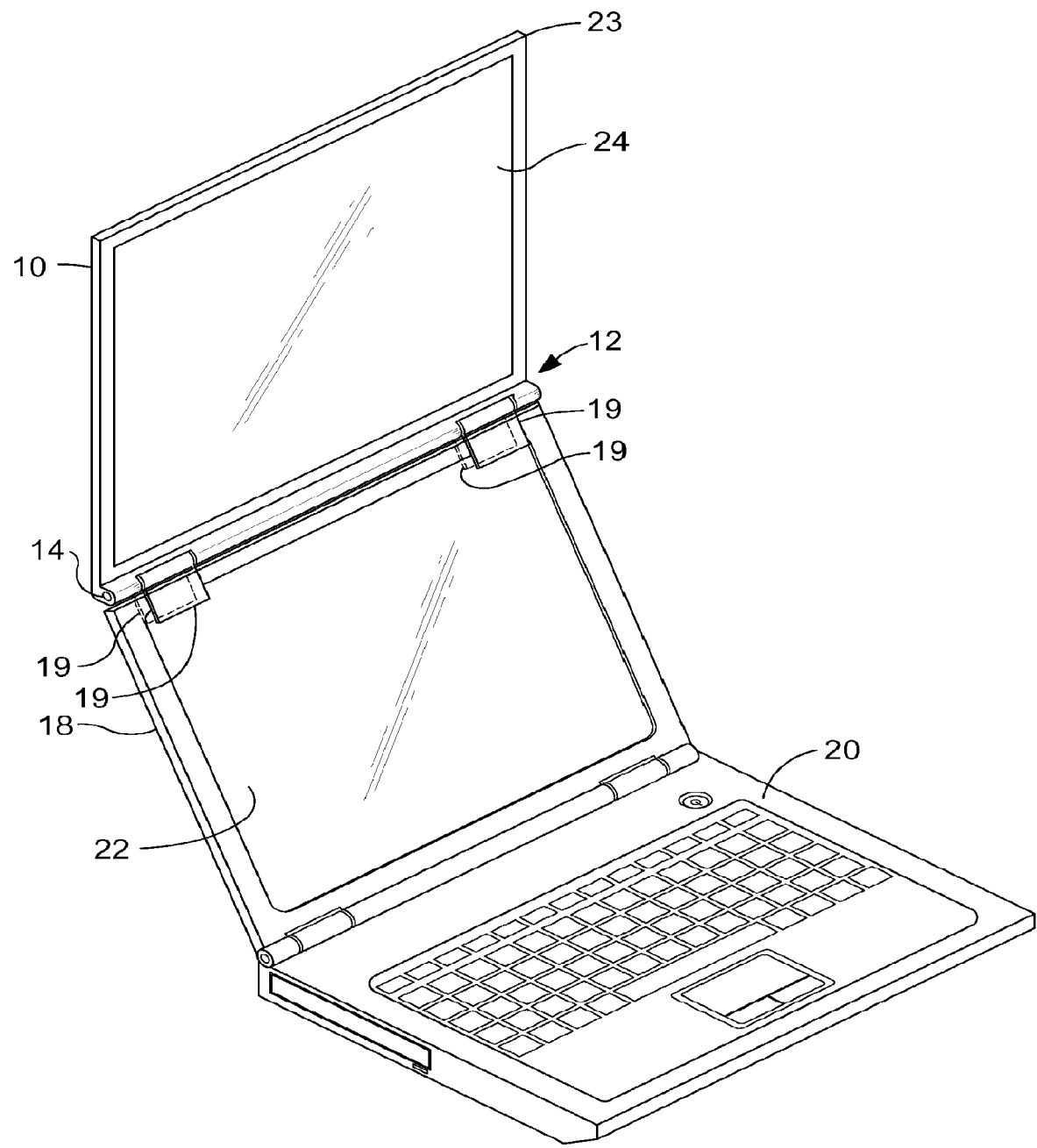
FIGS. 1A and 1B illustrate a display screen shade in deployed and stowed positions, respectively, according to an embodiment of the presently disclosed subject matter.

The presently disclosed subject matter is described with specificity to meet statutory requirements. However, the description itself is not intended to limit the scope of this patent. Rather, the inventors have contemplated that the claimed subject matter might also be embodied in other ways, to include different elements similar to the ones described in this document, in conjunction with other present or future technologies.

In accordance with a representative embodiment, a display screen shade for a mobile device includes a substantially light-transmissive and generally planar member light valve that can be positioned (referred to herein as the "stowed" position) in front of a display screen on a mobile device. When the device is being used under conditions of high ambient light (outdoors, for example), the light valve can be moved into a second position (referred to herein as the "deployed" position) where it can serve as a shade to make the screen more visible. When the screen is in the deployed position, the light valve changes from a substantially light-transmissive state in a high optical transmission mode to a substantially opaque state in a low optical transmission mode. The light valve can be an electrochromic device, a liquid crystal device, or other suitable element or technique in a configuration for switching between the high and low optical transmission modes. The presently disclosed display screen shade is particularly suited to mobile devices, such as, but not limited to, cellular telephones, PDAs, mobile computing devices, mobile electronic games, portable televisions, and the like.

As will be shown in the following examples, the display screen shade can constructed in a number of ways but a common feature is that the shade is transparent or substantially light-transmissive when not in use, allowing it to be conveniently stowed in front of the display screen such that it does not encumber the viewing of the display screen by a user. The display screen shade becomes opaque or substantially opaque upon moving to a second position when needed to provide shade to the display screen of the mobile device. The particular mechanical features that enable the shade to move between the stowed and deployed positions may vary from one application to another and may involve pivoting and/or sliding motions and may involve some range of adjustability in the deployed position. In all cases, a switching mechanism is provided to change the screen from transparent or substantially light-transmissive in the stowed position to opaque or substantially opaque in the deployed position.

It will be understood by those skilled in the art that light valves are generally not completely transparent (transmission=100%) or completely opaque (transmission=0%) but rather can be switched from a higher value (e.g., 70%) to a lower value (e.g., 20%). For a particular application, the skilled artisan can modify the performance using routine engineering principles. For example, the use of higher efficiency polarizers in an LCD light valve can decrease the transmission in the low optical transmission mode but will simultaneously reduce transmission somewhat in the high optical transmission mode. Thus, the optimal design for a particular application will involve a light valve that is opaque enough to form an effective shade when in the deployed position, and yet transmissive enough to allow adequate visibility of the display when stowed in the stowed position.

It will be further understood that, in general, the presently disclosed display screen shades are intended to be stowed in a position that lies substantially in front of the display. The deployed position, however, may vary and may be adjustable by the user over some useful range in a manner analogous to the sun visor in an automobile. In one deployed position, the shade may prevent the display screen from being viewed from the side.

Figure 1B:
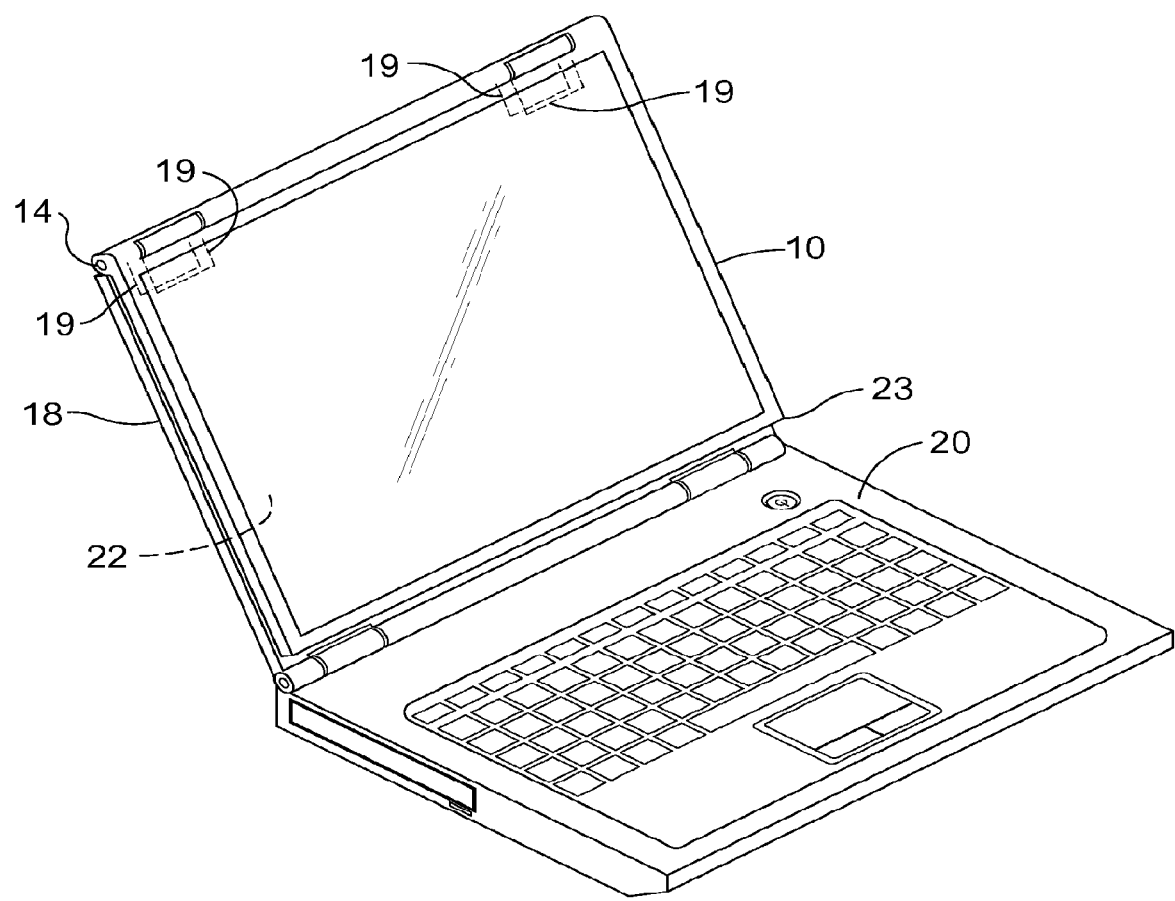

FIGS. 1A and 1B illustrate a display screen shade 10 in deployed and stowed positions, respectively, according to an embodiment of the presently disclosed subject matter. Referring to FIGS. 1A and 1B, the shade 10 includes a bracket assembly 12, a hinge 14, and a light valve 24. The bracket assembly 12 is configured for selectively attaching the shade 10 to a mobile device. In this example, the bracket assembly 12 is attached the shade 10 to a laptop computer 18. The bracket assembly 12 may include a pair of spaced-apart brackets 17 each having opposing legs 19 that define a space therebetween for gripping a portion of the laptop computer 18. The brackets 17 can be positioned at distal ends of the bracket assembly 12. The laptop computer 18 includes a keyboard 20 and display screen 22.

The shade 10 is attached to display screen 22 by the bracket assembly 12 and a frame 23, which substantially surrounds the edges of the display screen 22 and carries a light valve 24 by its edges. The light valve 24 is normally in a stowed position as depicted in FIG. 1B. When the laptop computer 18 is being used under conditions of high ambient light, light valve 24 may be moved into a deployed position (as depicted in FIG. 1A) where it can serve as a shade to make the display screen 22 more visible. In the stowed position, the light valve 24 can be substantially light-transmissive such that text, graphics, and the like displayed on the display screen 22 can be viewed through the light valve 24. When the shade 10 is in the deployed position, the light valve 24 can change from a substantially light-transmissive state to a substantially opaque state, using an electrochromic device, a liquid crystal device, or other suitable element or technique. The mechanical features that enable the shade to move between the first stowed position and the second deployed positions may vary from one application to another and may involve pivoting and/or sliding motions and may involve some range of adjustability in the deployed position.

The hinge 14 allows the frame 23 and light valve 24 to rotate between the deployed and stowed positions. In the stowed position, the shade 10 is positioned proximal to the display screen 22. In the deployed position, the positioning of the frame 23 and light valve 24 may be adjustable by the user over some useful range to allow the customization of angle of use.

Figures 2A, 2B:
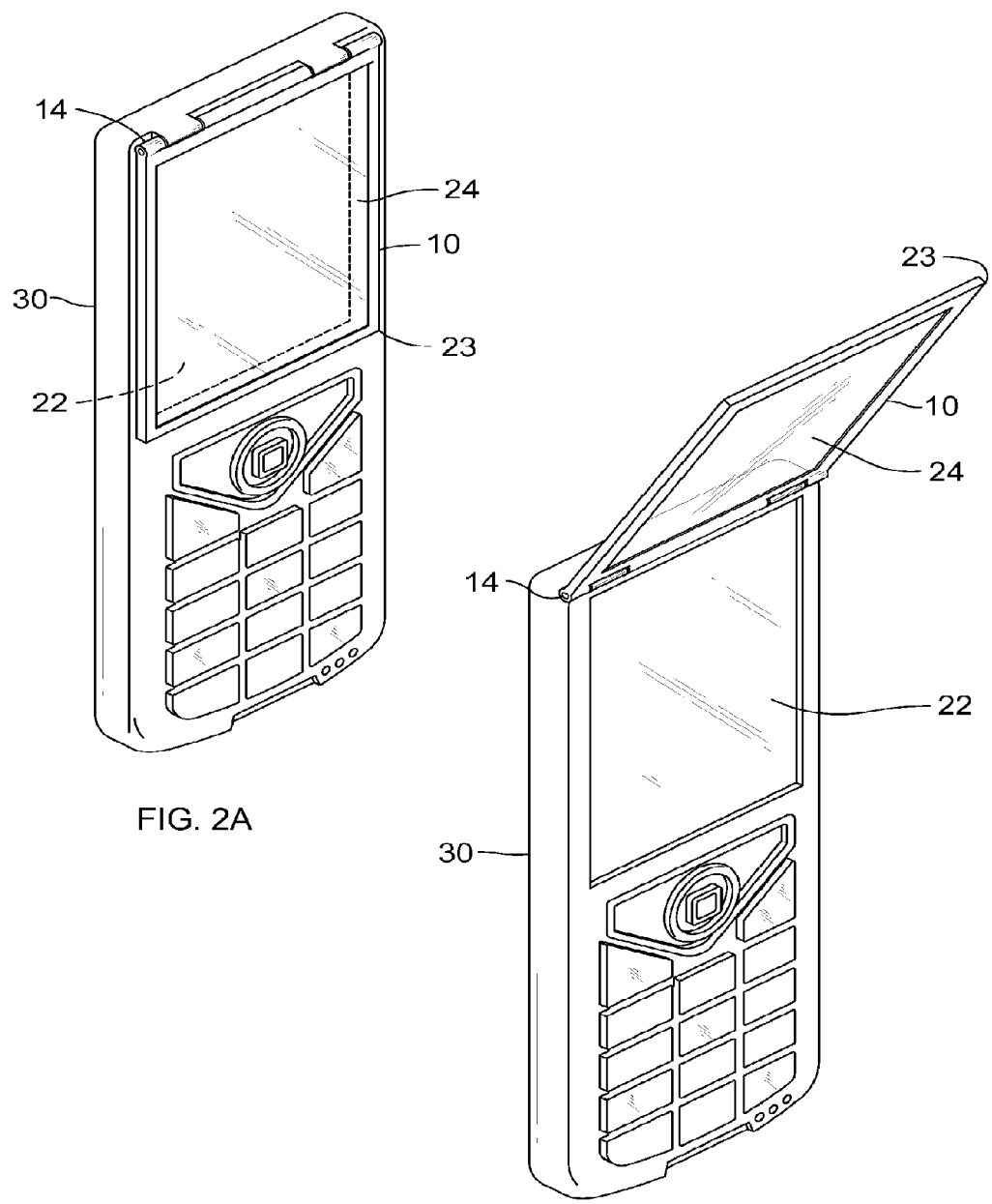
FIGS. 2A and 2B illustrate a display screen shade in stowed and deployed positions, respectively, according to another embodiment of the presently disclosed subject matter.
Figure 3A:
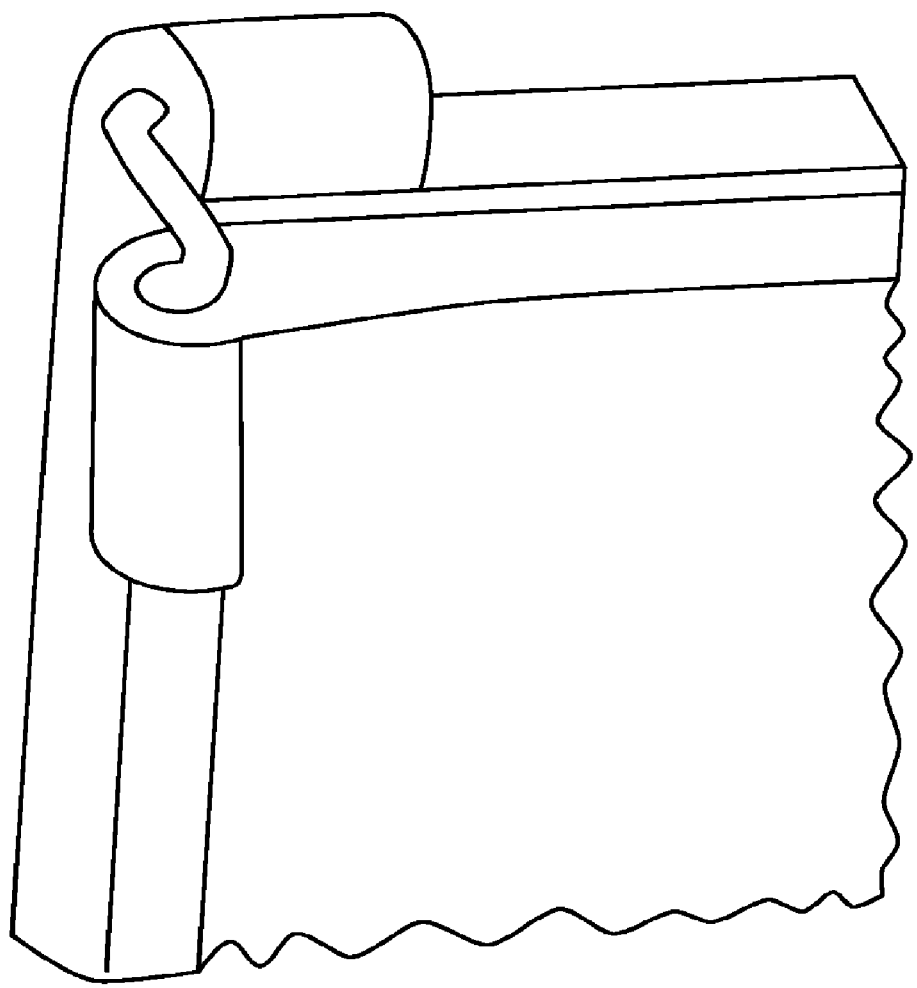
FIGS. 3A-3C are schematic diagrams of an embodiment of the present subject matter in which the mechanical support is configured for rotational movement of the light valve about at least two axes.
Figure 3B:
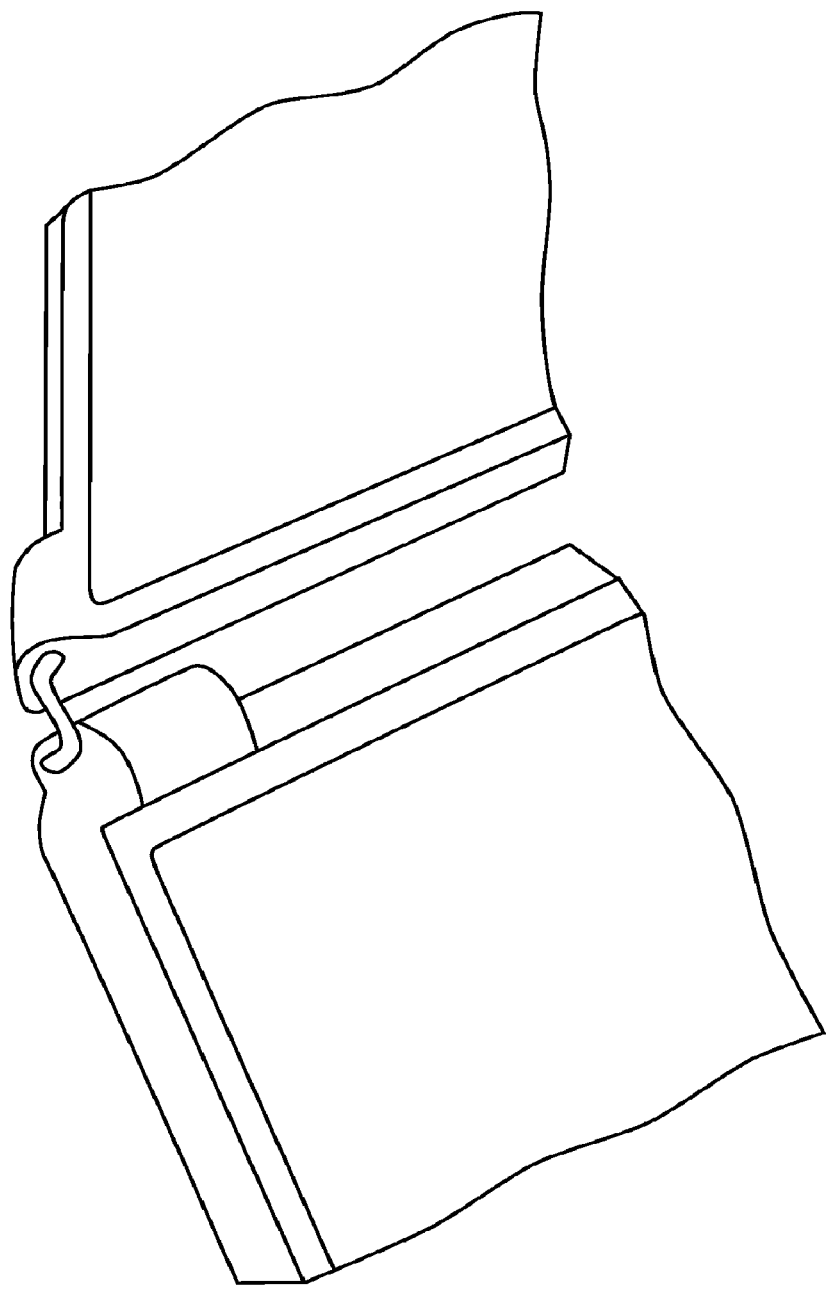
Figure 3C:
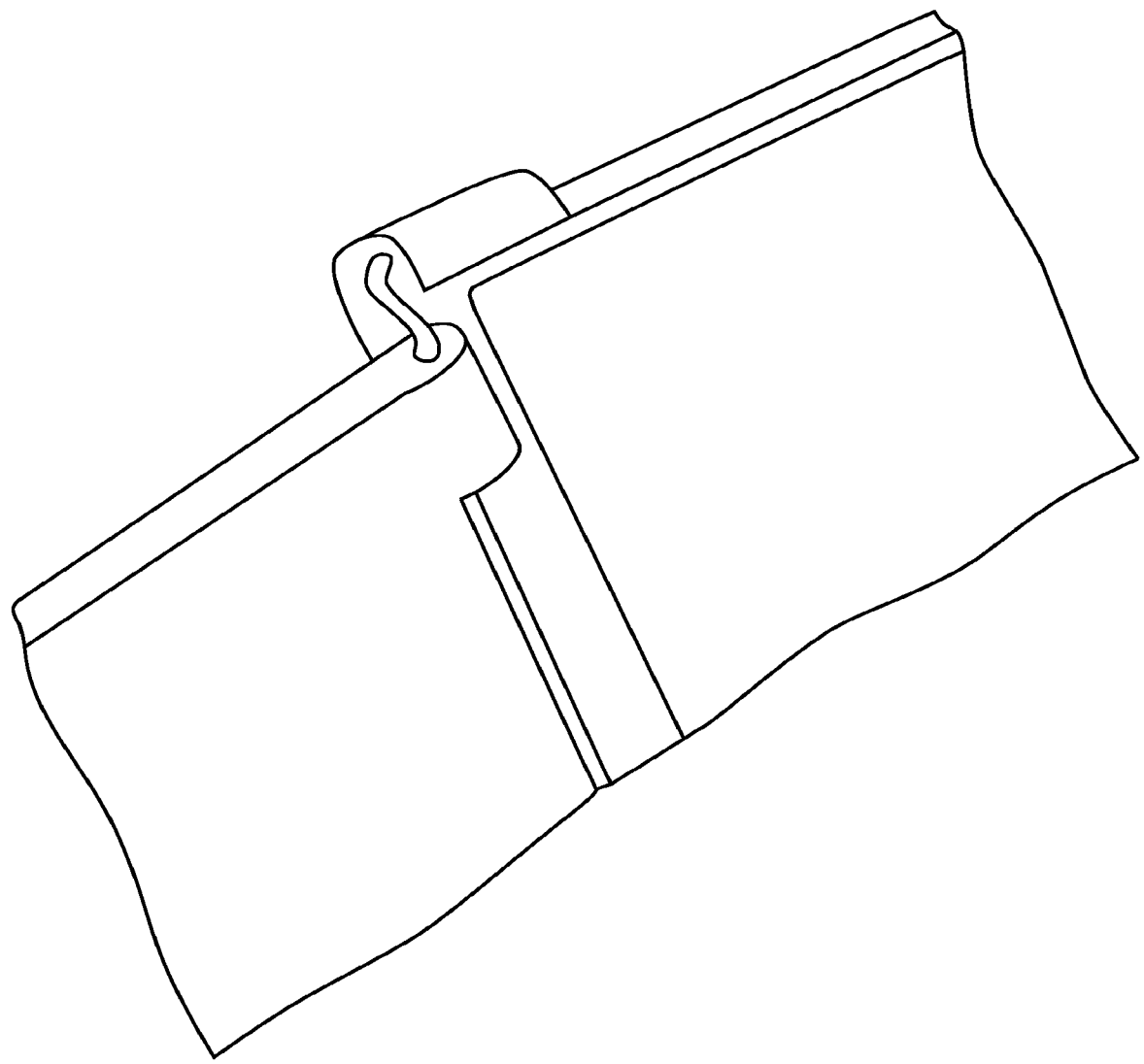

In another representative embodiment, the display screen shade may be affixed to a mobile device without the use of a bracket assembly. Particularly, the display screen shade may be permanently affixed to the mobile device. For example, FIGS. 2A and 2B illustrate a display screen shade 10 in stowed and deployed positions, respectively. Referring to FIGS. 2A and 2B, the hinge 14 of the shade 10 is permanently affixed to a portion of a mobile device 30 by any suitable technique. In the stowed position, the shade 10 is positioned proximal to the display screen 22. In the deployed position, the positioning of the elements of the shade 10 may be adjustable by the user over some useful range to allow the customization of angle of use.

In accordance with a representative embodiment, the shade 10 may include a switching component or switch (not shown) configured to allow a user to manually turn on or off the shade 10 for lightening or darkening the light valve 24 in a high and a low optical transmission mode, respectively. Alternatively, the switch can automatically darken the display screen shade 10 when it is moved from the stowed position to the deployed position, and can likewise automatically lighten shade 10 when it is returned to the stowed position.

A power source (not shown) can be provided to power the components of the shade 10 for powering and/or activating high and low optical transmission modes of the light valve 24. In many applications, the shade 10 will be integrated into the mobile device and the power source can draw its power from the mobile device via any conventional manner such as sliding contacts or a flexible circuit. Some displays, such as the Excelix LV0004 (available from Excel Technology Int'l Corp., 4 Stryker Lane Suite 5, Hillsborough, N.J.), are designed to operate at 3 to 9 V and are therefore particularly suited for low power applications. In an example, the power supply and control electronics of the shade 10 may be contained within the frame 23. Alternatively, a cable may be provided to allow the power source to obtain power from the mobile device via any suitable components or techniques. A power cord can connect the power source and the light valve for communicating electrical power between the power source and the light valve.

It will be appreciated that the specific details of the attachment hardware may easily be varied to accommodate different applications. For instance, as shown in FIGS. 1A and 1B, the bracket assembly 12 is configured to mechanically engage the upper edge of the display screen 22 of the laptop computer 18. For a device in which such an edge is not available, such as a portable television, the bracket assembly may be replaced by a flat surface with an adhesive pad, by which the shade 10 may be affixed to the top of a mobile device such as a portable television in such a position that it may be freely swung from the stowed to the deployed positions.

The previously-described light valves are, in many cases, notable for the fact that they require very little power, as power is only used to change states and not to maintain a particular state. For this reason, the power supply contained in the frame 23 may be a battery or a photovoltaic device. The use of photovoltaic power is especially attractive because the display screen shade is generally intended to be of most frequent use in bright sunlight.

The foregoing examples describe the primary use of the shade 10 to eliminate glare from sunlight in order to improve the visibility of display for the user. In an alternate embodiment, the presently disclosed display screen shades can be used as a privacy shade to prevent non-users from viewing the display (a well known concern when using a laptop computer on an airplane, for example). This added functionality can be incorporated easily into the presently disclosed shade in any of several ways.

In an original equipment manufacturer (OEM) application, where the display screen shade is built directly into the device, the hinge may be reconfigured as a ball and socket joint (like that on an automobile sun visor) so that the display screen shade may be rotated into a position substantially normal to the plane of a display but to one side of it instead of above it.

In an aftermarket application, if a frame of the display screen shade is fitted with the bracket assembly that mechanically engages the edge of a laptop computer, the frame can be disengaged from the top edge and engaged on one of the side edges as needed to block the view from that side.

As used herein, the term display encompasses any electronic digital or analog display or imaging device, including, but not limited to, back-lit displays, Light Emitting Diode (LED) displays, Liquid Crystal Displays (LCD), Cathode Ray Tube (CRT) displays, and the like.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A display screen shade for a mobile device, the display screen shade comprising: a bracket assembly configured for removable attachment to the mobile device; an electrically-switchable light valve for selecting covering a display screen of the mobile device; and a hinge attached to the bracket assembly and the light value, and configured to permit movement of the light valve between a first position and second position when the bracket assembly is attached to the mobile device, wherein in the first position the light valve substantially covers the display screen, and wherein in the second position the light valve is positioned further from the display screen than in the first position; and wherein the light valve is configured to function in a high optical transmission mode and a low optical transmission mode, wherein the light valve is substantially light-transmissive in the high optical transmission mode when the light valve is positioned in the first position, and wherein the light valve is substantially opaque in the low optical transmission mode when the light valve is positioned in the second position.

2. The display screen shade according to claim 1, wherein the bracket assembly comprises at least one bracket including opposing legs that define a space therebetween for gripping a portion of the mobile device.

3. The display screen shade according to claim 2, wherein the at least one bracket includes first and second brackets being spaced apart for gripping different portions of the mobile device.

4. The display screen shade according to claim 3, wherein each of the first and second brackets are positioned at distal ends of the bracket assembly.

5. The display screen shade according to claim 1, further comprising a power source configured to power and activate the low and high optical transmission modes of the light valve.

6. The display screen shade according to claim 5, further comprising a power cord for communicating electrical power between the power source and the light valve.

7. The display screen shade according to claim 1, further comprising a frame configured to carry the light valve.

8. A display screen shade for a mobile device, the display screen shade comprising:
 a substantially planar light valve capable of being electrically switched between a high optical transmission mode and a low optical transmission mode, the light valve having an active area such that a display screen of the mobile device is viewable therethrough when the light valve is in a first position;
 a mechanical support configured to allow the light valve to be moved between the first position and a second position, wherein the light valve is positioned to shade a display screen of the mobile device in the second position;

a power supply for the light valve; and a switch configured to activate the power supply to change the light valve from the high optical transmission mode in the first position to the low optical transmission mode in the second position, wherein the low optical transmission mode is less transmissive than the high optical transmission mode.

9. The display screen shade of claim 8, wherein the light valve is one of an electrooptic device, an electrochromic device, and a liquid crystal device.

10. The display screen shade of claim 8, wherein the mechanical support is configured for rotational movement of the light valve about at least one axis.

11. The display screen shade of claim 8, wherein the mechanical support is configured for rotational movement of the light valve about at least two axes.

12. The display screen shade of claim 8, wherein the second position disposes the light valve above the display screen of the mobile device to shade the display screen from ambient light.

13. The display screen shade of claim 8, wherein the second position disposes the light valve alongside the display device to prevent the display screen from being viewed from the side.

14. The display screen shade of claim 8, wherein the power supply is one of a battery and a photovoltaic device.

15. The display screen shade of claim 8, wherein the switch is automatically engaged when the light valve is moved from the first to the second positions.

16. The display screen shade of claim 8, wherein the switch is configured to be operated by a user independently of the physical movement of the light valve.

* * * * *